United States Patent [19]
Crawford

[11] Patent Number: 4,646,537
[45] Date of Patent: Mar. 3, 1987

[54] HOT WATER HEATING AND DEFROST IN A HEAT PUMP CIRCUIT

[75] Inventor: James G. Crawford, Tyler, Tex.

[73] Assignee: American Standard Inc., New York, N.Y.

[21] Appl. No.: 793,365

[22] Filed: Oct. 31, 1985

[51] Int. Cl.[4] .............................................. F25B 27/00
[52] U.S. Cl. .................................. 62/238.6; 62/238.7
[58] Field of Search ................ 62/324.1, 324.4, 238.6, 62/238.7

[56] References Cited

U.S. PATENT DOCUMENTS

| | | | |
|---|---|---|---|
| 2,309,165 | 1/1943 | Candor | 257/3 |
| 2,440,146 | 4/1948 | Kramer | 62/115 |
| 2,718,764 | 9/1955 | Kramer | 62/3 |
| 2,801,523 | 8/1957 | Hansen | 62/3 |
| 2,807,145 | 9/1957 | Henderson | 62/3 |
| 3,071,935 | 1/1963 | Kapeker | 62/155 |
| 3,188,829 | 6/1965 | Siewert et al. | 62/160 |
| 3,665,723 | 5/1972 | Okutus | 62/196 |
| 3,916,639 | 11/1975 | Schmidt | 62/238 |
| 4,098,092 | 7/1978 | Singh | 62/238 |
| 4,299,098 | 10/1981 | Derosier | 62/238 |
| 4,399,664 | 8/1983 | Derosier | 62/238 |
| 4,476,920 | 10/1984 | Drucker et al. | 165/29 |
| 4,493,193 | 1/1985 | Fisher | 62/324.4 X |
| 4,493,194 | 1/1985 | Briccetti | 62/180 |
| 4,528,822 | 7/1985 | Glamm | 62/238 |

*Primary Examiner*—Lloyd L. King
*Attorney, Agent, or Firm*—Ronald M. Anderson; Carl M. Lewis; William J. Beres

[57] ABSTRACT

An air-to-air heat pump system includes a refrigerant-liquid heat exchanger for heating a liquid. The system is capable of (1) space cooling, or (2) space heating, or (3) liquid heating without affecting the condition of an indoor space, or (4) simultaneous space cooling and liquid heating, or (5) simultaneous space heating and liquid heating, or (6) defrosting the outdoor heat exchanger without affecting the condition of an indoor space by utilizing heat supplied from a stored previously-heated liquid.

12 Claims, 6 Drawing Figures

HOT WATER HEATING AND DEFROST IN A HEAT PUMP CIRCUIT

BACKGROUND OF THE INVENTION

1. Field of the Invention

The present invention relates generally to the art of refrigeration. More particularly, this invention is directed to the modification of a basic heat pump circuit to additionally accomplish the heating of a liquid, such as hot water for domestic applications. With still more particularity, the present invention relates to an air-to-air heat pump circuit capable of heating a liquid and in which heat for defrost of the outdoor coil is capable of being supplied entirely from stored, previously heated liquid. Finally, this invention relates to a heat pump circuit capable of (1) cooling a space; (2) heating a space; (3) heating a liquid without affecting the temperature of a conditioned space; (4) cooling a space while heating a liquid; (5) heating a space while heating a liquid; and, in addition to the standard method of defrost wherein defrost heat is supplied from a conditioned space, is capable of (6) defrosting the outdoor coil using only stored previously heated liquid as a heat source.

2. Background Art

Commonly available devices known as heat pumps are reversible refrigeration systems capable of conditioning a space by heating or cooling the air within the space. Outdoor air is used as a heat source or heat sink depending upon the particular mode of heat pump operation. The use of heat pump systems to additionally provide for the heating of a liquid utilizing heat otherwise rejected as waste heat has previously been recognized as being energy efficient. Representative in this regard are U.S. Pat. Nos. 3,916,638 to Schmidt; 4,299,098 to Derosier and 4,528,822, to Glamm, the latter two being assigned to the assignee of the present invention. The aforementioned hot water heating heat pump systems cannot, however, accomplish the heating of water while the heating of a space is simultaneously occurring. Even more versatile than the aforementioned circuits are the heat pump systems taught by U.S. Pat. Nos. 3,188,829 to Siewert et al, 4,098,092 to Singh and 4,399,664 to Derosier, the last being assigned to the assignee of the present invention. All of these disclose heat pump circuits having the capability to heat water while simultaneously providing heat to a space.

One disadvantage, inherent in the operation of air-to-air heat pump systems, relates to the buildup of frost on the outdoor heat exchanger coil when indoor space heating is called for in the heating season and outdoor ambient conditions are conducive to the buildup of frost on the outdoor coil as heat is extracted from the ambient. When conditions are conducive to frost buildup, moisture is precipitated out of the cool air being drawn over and through the outdoor coil at the coil surface where it solidifies in the form of frost or ice. The buildup of frost insulates the heat exchanger coil with the result that the heat exchange capability of the coil is degraded and the ability of the heat pump circuit to deliver heat to heat water and/or a conditioned space suffers markedly. The need for timely and effective defrost of the outdoor coil naturally follows.

A common method of defrosting the outdoor coil in a heat pump circuit is known as reverse cycle defrost which entails reversing the operation of the heat pump system from the space heating mode to the space cooling mode of operation. The effect of such mode reversal is to direct the hot gas discharged by the compressor within the system directly to the outdoor coil, as normally occurs in the space cooling mode, as opposed to directing the hot gas to the indoor heat exchanger as normally occurs in the space heating mode.

During periods of space heating the indoor coil acts as a condenser and the outdoor coil as an evaporator with the result that heat from the hot refrigerant gas discharged from the compressor is given up to the indoor space while heat is extracted from the outdoor ambient for ultimate use indoors. In current reverse cycle defrost schemes, i.e., when a heat pump is shifted to what would normally be a space cooling mode, heat is given up to the outdoor coil, which functions as a condenser, and melts the frost buildup on the coil. Since the indoor coil functions as an evaporator in reverse cycle defrost modes it extracts heat from its surroundings, i.e., the heated indoor space. The extraction of heat and the resultant lowering of the temperature of the indoor space when conditions in fact call for space heating is clearly an undesirable result and has previously required the energization of a supplemental heat source, such as electrical resistance heaters or a furnace, while the heat pump system is in the defrost mode. The net result of the use of such supplemental heating is the defrost of the outdoor coil at a coefficient of performance of approximately 1.0. See for example the heat pump system illustrated in recently issued U.S. Pat. Nos. 4,493,194 to Bricetti and 4,476,920 to Drucker. Such supplemental heat is significantly more expensive than the heat provided by the heat pump system just as is the electrical resistance heat utilized to heat water in conventional water heating systems. In none of the previously noted art is there disclosed a heat pump system sufficiently versatile to simultaneously heat a space and a liquid in one mode while offering a defrost mode in which the condition of an indoor space is unaffected and in which the source of defrost heat is exclusively a stored previously heated liquid. As should be apparent from the stream of related U.S. patents continuing to issue in this area the need remains for a more versatile and energy efficient heat pump system which is capable of simultaneously heating a space while heating a liquid and which offers defrost of the outdoor heat exchanger coil without the extraction of heat from a heated space.

SUMMARY OF THE INVENTION

The present invention is a heat pump circuit capable of (1) cooling a space; (2) heating a space; (3) heating a liquid without affecting the temperature of a conditioned space; (4) cooling a space while heating a liquid; (5) heating a space while heating a liquid; and (6) defrosting the outdoor coil using only stored previously heated liquid as a heat source. The circuit includes a refrigerant compressor; an indoor blower-coil arrangement; an outdoor fan-coil arrangement; a refrigerant-liquid heat exchanger; means for pumping liquid through the refrigerant-liquid heat exchanger to and from a liquid storage tank such as a domestic hot water heater; and the conduit and valving necessary to accomplish the selective routing of refrigerant through the system components in accordance with the particular operational mode called for.

In the space cooling mode, refrigerant gas is directed from the compressor to the outdoor coil where the gas is condensed and directed to the indoor coil. The condensed refrigerant is then vaporized in the indoor coil, extracting heat from the indoor space in the process, and is next returned to compressor suction. In the space heating mode, refrigerant gas is directed from the compressor to the indoor coil where it condenses giving up heat to the indoor space. The refrigerant is then directed to the outdoor coil where it is vaporized and returned to compressor suction.

In the water heating mode refrigerant gas is directed from the compressor to the refrigerant-liquid heat exchanger where it is desuperheated and/or condensed and gives up heat to the liquid circulating therethrough. The refrigerant is next directed from the refrigerant-liquid heat exchanger to the outdoor coil where it is vaporized and returned to compressor suction.

In the simultaneous space cooling-liquid heating mode of operation refrigerant gas is directed from the compressor to the refrigerant-liquid heat exchanger where it gives up heat to the liquid circulating therethrough. The refrigerant is next directed to the outdoor coil where it condenses prior to being delivered to the indoor coil where it vaporizes absorbing heat from the indoor space. In the simultaneous space heating-liquid heating mode refrigerant gas is discharged directly from the compressor to the refrigerant-liquid heat exchanger where it is desuperheated and gives up heat to the liquid circulating therethrough. The refrigerant next enters the indoor coil where it condenses, giving up additional heat to the indoor space. The condensed refrigerant is next directed to the outdoor coil where it vaporizes and is returned to compressor suction.

In a primary defrost mode, hot refrigerant gas is discharged directly from the compressor to the outdoor coil for defrost purposes. The condensed refrigerant is thence directed to the refrigerant-liquid heat exchanger where it is vaporized in a heat exchange relationship with the liquid circulating therethrough. The refrigerant is next returned to the compressor suction port. It is contemplated that this defrost mode will be employed whenever conditions are such that the stored liquid has been at least partially heated by the heat pump system and/or when the stored liquid can be reheated subsequent to defrost by the heat pump system. In this defrost mode the heated indoor space is unaffected by the defrost operation. Further, heat stored and replaced at a coefficient of performance of greater than 1.0 is employed to accomplish outdoor coil defrost. A still further advantage of the first defrost mode is that defrost is accelerated by virtue of the heat source (hot water tank) being hotter than the heat source (indoor air) in prior heat pump systems. Defrost of the outdoor coil may of course also be accomplished in the circuit of the present invention as in a standard heat pump system by operating the heat pump system in the space cooling mode of operation for the requisite period of time. In the heat pump system of this invention the latter defrost mode is considered to be a secondary mode. It is noted that below the heat pump's thermal balance point (i.e., heating load greater than system heating capacity) employment of the first defrost mode does not improve heat pump efficiency because the stored liquid must be heated utilizing a supplemental heat source.

It will be appreciated that it is an object of this invention to provide a versatile heat pump circuit capable of heating a liquid, such as water for domestic use.

Still another object of this invention is to provide a liquid heating heat pump circuit in which a liquid is capable of being heated while a space is simultaneously heated.

It is a further object of this invention to provide a liquid heating heat pump circuit which provides for both (1) simultaneous liquid and space heating and (2) for defrost of the outdoor coil wherein the source of defrost heat is a stored previously-heated liquid and the condition of a heated space is unaffected by the defrost operation.

Finally, another object of this invention is to effect accelerated defrost of the outdoor coil in a heat pump system by employing a heat source which is at a temperature higher than the temperature of a heated indoor space and which heat has been stored and/or is capable of being replaced at a coefficient of performance of greater than 1.0.

These and other objects and advantages of the present invention will become apparent from the following description of the preferred embodiment and the accompanying drawing.

DESCRIPTION OF THE PREFERRED EMBODIMENT

Figure 1:
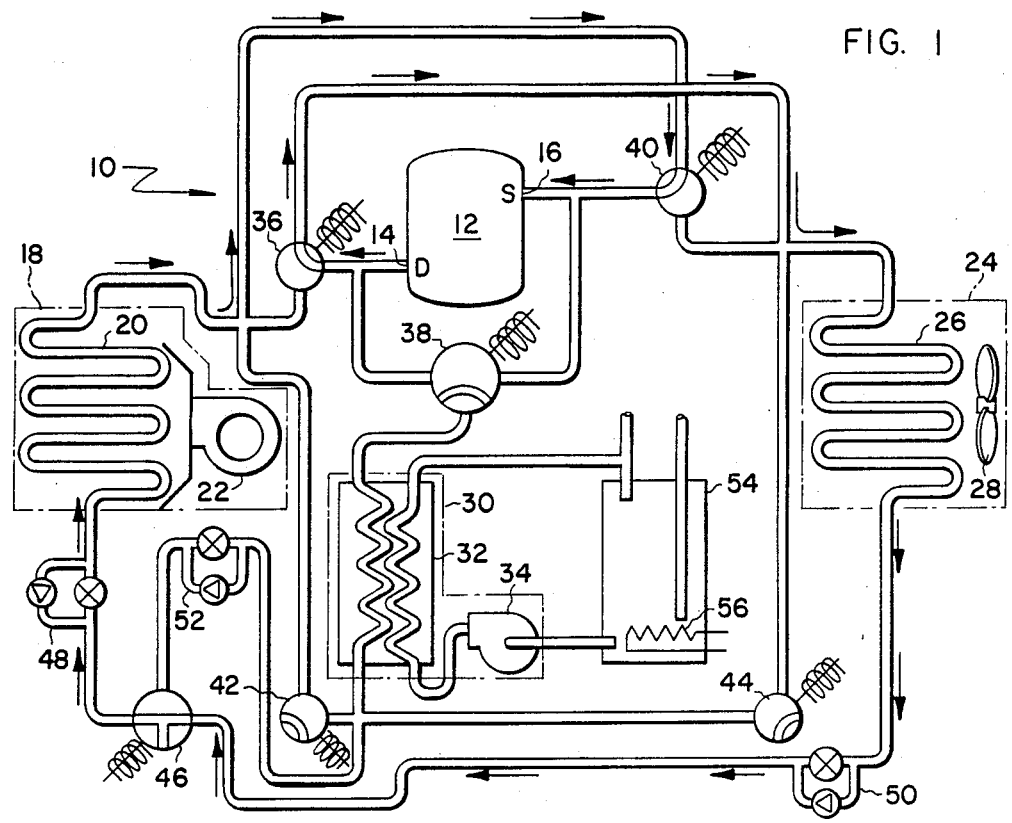
FIG. 1 is a schematic diagram of the present invention in the space cooling mode of operation.

Referring to FIGS. 1-6, which differ only in the position of selected valves and therefore illustrate different flow paths for refrigerant within refrigeration circuit 10, it will be seen that compressor 12 has a discharge port 14 and a suction port 16. Circuit 10, a modified air-to-air heat pump circuit, additionally includes first selectively activated heat exchange means 18 which includes heat exchanger 20 and blower 22; second selectively activated heat exchange means 24 which includes heat exchanger 26 and fan 28; and third selectively activated heat exchange means 30 which includes heat exchanger 32 and pump 34. First heat exchange means 18 in the preferred embodiment is a unit through which indoor air can be blown in a heat exchange relationship with refrigerant passing through heat exchanger 20 when first heat exchange means 18 is activated. Second heat exchange means 24 is a unit through which outdoor air is drawn in a heat exchange relationship with refrigerant passing through heat exchanger 26 when second heat exchange means 24 is activated. Third heat exchange means 30, which is preferably a desuperheater but which can also be a condenser, is a unit through which a liquid is pumped in a heat exchange relationship with refrigerant passing through heat exchanger 32 when heat exchange means 30 is activated. It is contemplated that the liquid pumped through heat exchanger 32 will be water circulated out of and back to a domestic hot water heater. Six valves, 36, 38, 40, 42, 44, and 46, respectively, serve to direct the flow of refrigerant within circuit 10. Additionally, three expansion valve/check valve combinations 48, 50 and 52 are employed in circuit 10 to selectively meter refrigerant to the heat exchange means with which the valve combinations are individually associated. The use of pressure reducing devices other than expansion valves, such as capillary tubes or orifices, is, of course, contemplated. First expansion valve combination 48 is associated with first heat exchange means 18, second expansion valve combination 50 is associated with second heat exchange means 24, and third expansion valve combination 52 is associated with third heat exchange means 30. Finally, storage tank 54, which is preferably a domestic hot water heater, is connected for flow with third heat exchange means 30. As illustrated in the Figures, pump 34 pumps the liquid stored in tank 54 from the bottom of the storage tank through heat exchange means 30 and back to the upper portion of the storage tank. Storage tank 54 will normally include supplemental heating means 56 by which heat can be supplied to the stored liquid when refrigeration circuit 10 is unable to do so in part or in full.

As illustrated in the Figures, valves 36, 38, 40, 42, 44 and 46 are solenoid operated valves. As will be immediately apparent to those skilled in the art, several other circuit configurations can readily be envisioned based upon the teachings of this disclosure. Such configurations might include more or fewer valves of different types or capabilities as well as the conduit necessary to interconnect those valves. The choice of the type of valves and the numbers of ports in each valve is considered to be matter of design choice and is likely to be driven by the economics of valve pricing and the price of refrigerant conduit. Additionally, the packaging of the various heat exchange units, particularly second heat exchange means 24 which is the outdoor unit of an air-to-air heat pump system, may dictate the particular valve and conduit configuration to be employed. Therefore, it must be understood from the outset that the circuit taught herein, which is unlike any other circuit known in its ability to simultaneously accomplish the heating of a space and the heating of a liquid yet which is capable of defrosting the outdoor heat exchanger coil utilizing only stored previously-heated liquid, is not in any way limited to the particular conduit and valve arrangement illustrated in the Figures. Rather, the refrigerant circuit of this invention is limited only by the language of the claims found herein.

OPERATIONAL MODES

In a first mode of operation, the circuit of the present invention achieves the cooling of a space utilizing ambient outdoor air as a heat sink. Referring to FIG. 1, in a space cooling mode compressor 12 discharges superheated gaseous refrigerant through valve 36 to second heat exchange means 24. Fan 28, and therefore second heat exchange means 24, is activated in this mode with the result that outdoor air is drawn through heat exchanger 26. The outdoor air acts to condense and cool the refrigerant gas passing through the heat exchanger. Condensed refrigerant passes out of second heat exchange means 24, through the check valve portion of expansion valve combination 50, through valve 46 and is directed to the expansion valve portion of expansion valve combination 48. The condensed refrigerant is metered through the expansion valve portion of expansion valve combination 48 and into first heat exchange means 18. Blower 22 of heat exchange means 18 is energized in the space cooling mode. Refrigerant entering heat exchanger 20 of first heat exchange means 18 is vaporized by the receipt of heat from the indoor air being blown through heat exchanger 20 by blower 22. Refrigerant gas exiting first heat exchange means 18 is finally directed back to compressor suction port 16 after having passed through valve 40. In the space cooling mode refrigerant is not directed through third heat exchange means 30 which is inactive.

Figure 2:
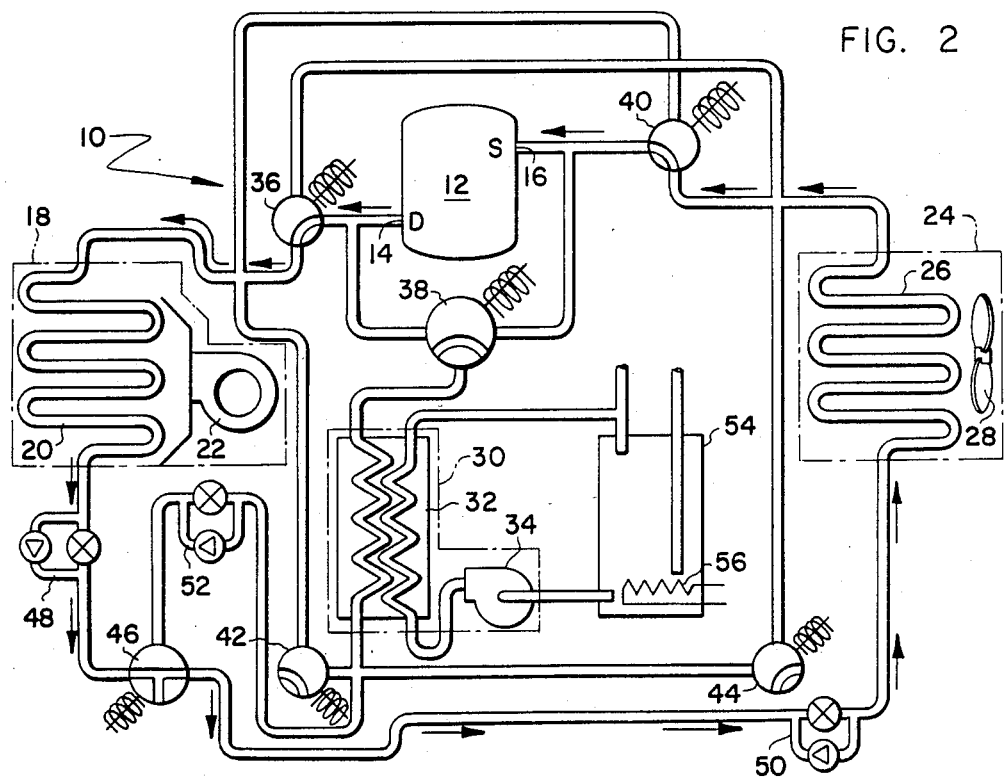
FIG. 2 is a schematic diagram of the present invention in the space heating mode of operation.

In a second mode of operation, the present invention achieves the heating of a space utilizing ambient outdoor air as a heat source. Referring to FIG. 2, in the space heating mode compressor 12 discharges superheated gaseous refrigerant through discharge port 14 and through valve 36 to first heat exchange means 18. Blower 22, and therefore heat exchange means 24, is activated with the result that indoor air blown through heat exchanger 20 acts to condense the refrigerant gas passing therethrough. As a result, the indoor air passing across heat exchanger 20 is heated and the refrigerant passing through heat exchanger 20 gives up heat. Condensed refrigerant gas passes out of first heat exchange means 18 through the check valve portion of expansion valve combination 48 and through valve 46 prior to being metered through the expansion valve portion of expansion valve combination 50. The condensed refrigerant metered out of expansion valve combination 50 is directed into heat exchanger 26 of second heat exchange means 24. Fan 28 of heat exchange means 24 is activated in this mode. Refrigerant entering heat exchanger 26 is vaporized by the receipt of heat from the outdoor air being drawn through heat exchanger 26 by fan 28. Refrigerant gas exiting second heat exchange means 24 is directed back to compressor suction port 16 after having passed through valve 40. In the space heating mode, refrigerant is not directed through third heat exchange means 30 which is inactive.

Figure 3:
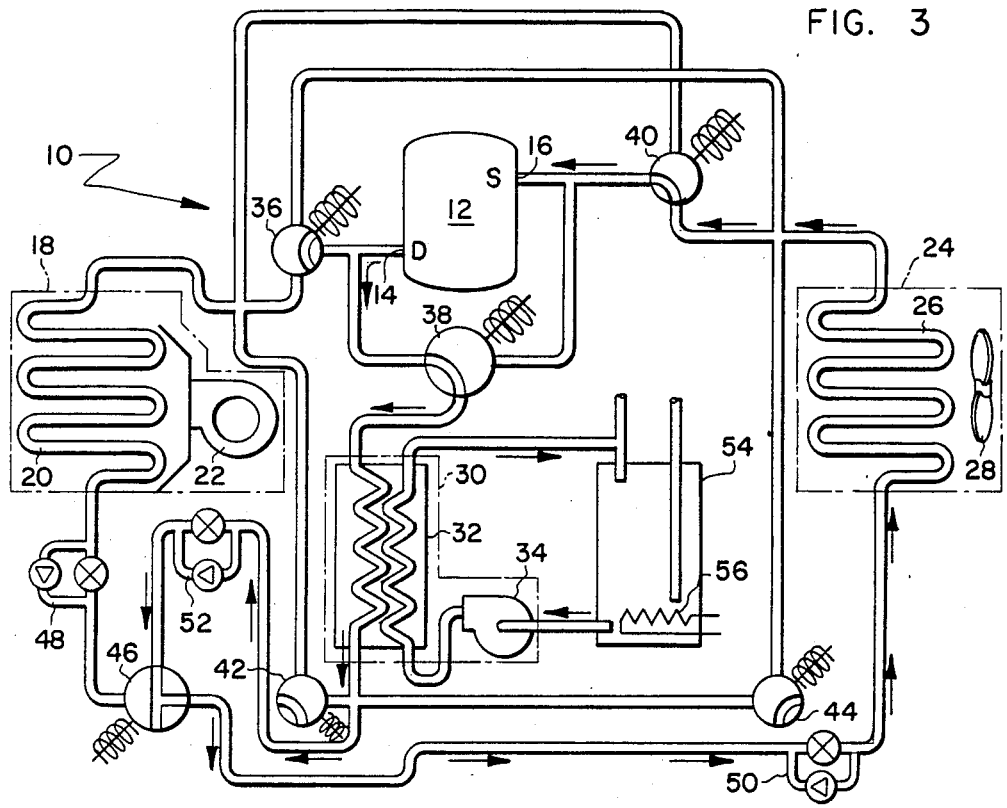
FIG. 3 is a schematic diagram of the present invention in the water heating mode of operation.

In a third mode of operation, the present invention achieves the heating of a liquid utilizing outdoor ambient air as a heat source. The condition of the indoor space is not affected in this mode. Referring to FIG. 3, in the liquid heating mode of operation compressor 12 discharges superheated gaseous refrigerant through valve 38 to third heat exchange means 30. Pump 34, and therefore third heat exchange means 30, is activated with the result that liquid circulated through heat exchanger 32 acts to condense the refrigerant gas passing therethrough. The circulated liquid is heated while the refrigerant gas is cooled. Condensed refrigerant gas passes out of third heat exchange means 30 and through the check valve portion of expansion valve combination 52. The refrigerant next passes through valve 46 and into the expansion valve portion of expansion valve combination 50. The refrigerant is then metered through expansion valve combination 50 and is directed into second heat exchange means 24. Fan 28 of heat exchange means 24 is activated in this mode. Refrigerant entering heat exchanger 26 of second heat exchange means 24 is vaporized by the receipt of heat from the outdoor ambient air being drawn through heat exchanger 26 by fan 28. Refrigerant gas exiting second heat exchange means 24 is finally directed back to compressor suction port 16 after having passed through valve 40. In the liquid heating mode, refrigerant is not directed through first heat exchange means 18 which is inactive. The temperature of the indoor space is therefore unaffected during the liquid heating mode of operation.

Figure 4:
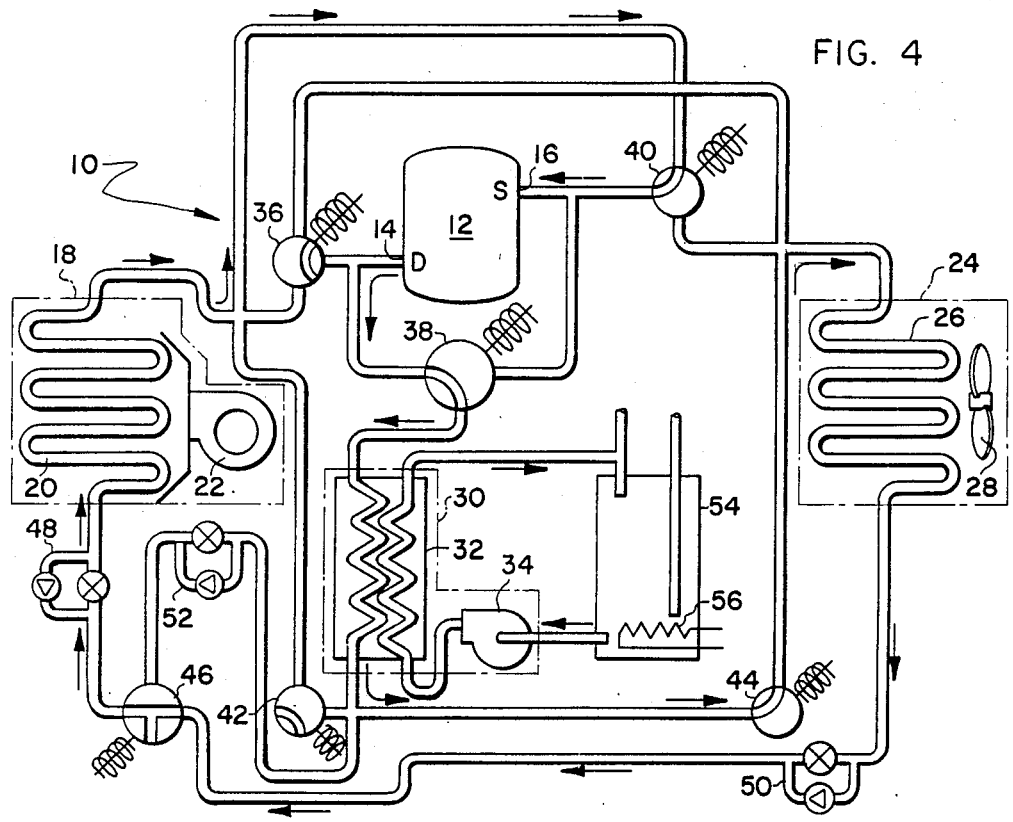
FIG. 4 is a schematic diagram of the present invention in the simultaneous space cooling-liquid heating mode of operation.

In a fourth mode of operation, the present invention achieves the simultaneous cooling of the space and heating of a liquid. Referring to FIG. 4, in the simultaneous space cooling-liquid heating mode compressor 12 discharges superheated gaseous refrigerant through discharge port 14 and valve 38 to third heat exchange means 30. Pump 34, and therefore third heat exchange means 30, is activated with the result that the liquid circulating through heat exchanger 32 is heated and the refrigerant gas is cooled. Depending upon system operating parameters, the superheated refrigerant is at least desuperheated and may be partially condensed within third heat exchange means 30. As previously mentioned, while heat exchanger 32 is preferably a desuperheater it can also be a condenser. By limiting the heat exchange which occurs within heat exchanger 32 in this mode so that the refrigerant is only desuperheated, as opposed to being condensed, system efficiency is enhanced. One way in which such a limitation can be effected is by reducing the flow of the liquid through the heat exchanger. In any case, the still hot and perhaps superheated refrigerant passes out of third heat exchange means 30 and is next directed through valve 44 to second heat exchange means 24. Fan 28 of second heat exchange means 24 is activated in this mode of operation with the result that the refrigerant gives up additional heat to the outdoor air being drawn through heat exchanger 26. Condensed refrigerant exits second heat exchange means 24, passes through the check valve portion of expansion valve combination 50 and through valve 46 prior to entering the expansion valve portion of expansion valve combination 48. The refrigerant is then metered through expansion valve combination 48 into first heat exchange means 18. Refrigerant entering heat exchanger 20 of heat exchange means 18 is vaporized by the exchange of heat which occurs between the metered condensed refrigerant and the indoor air being blown through heat exchanger 20 by blower 22 which is activated. The vaporized refrigerant exits first heat exchange means 18 and is directed back to the compressor suction port 16 after passing through valve 40.

Figure 5:
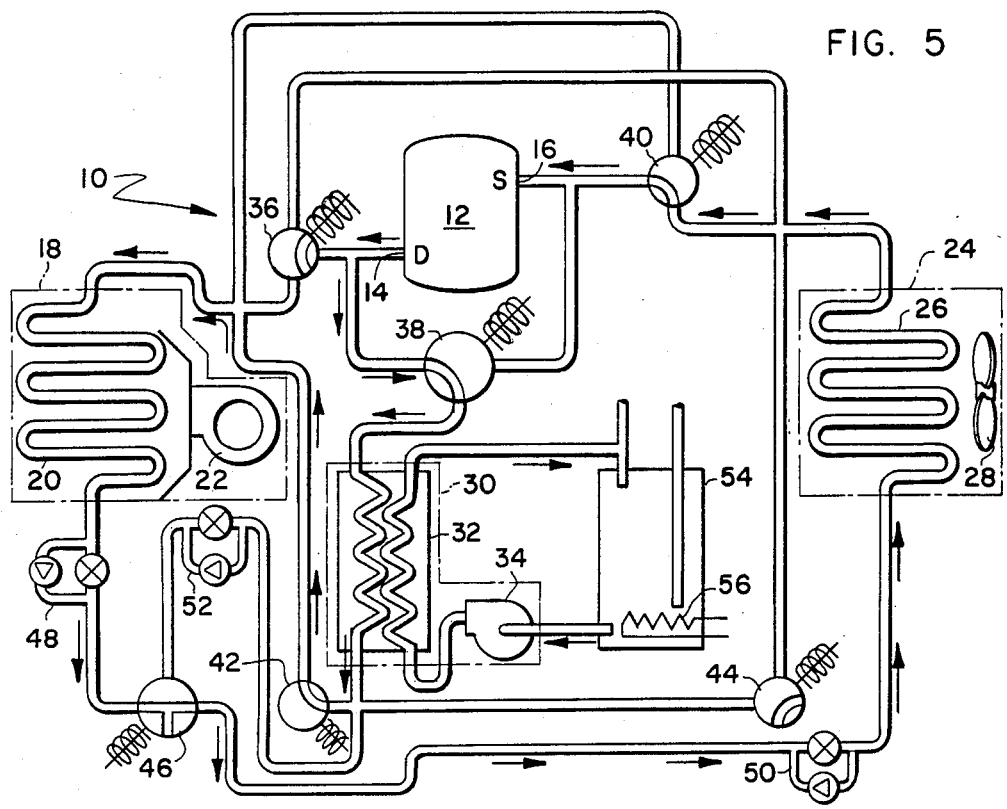
FIG. 5 is a schematic diagram of the present invention in the space heating-liquid heating mode of operation.

In a fifth mode of operation the present invention achieves the simultaneous heating of a space and heating of a liquid. Referring to FIG. 5, in the simultaneous space heating-liquid heating mode compressor 12 discharges superheated gaseous refrigerant through discharge port 14 and valve 38 to third heat exchange means 30. Pump 34, and therefore third heat exchange means 30, is activated with the result that the liquid circulated through heat exchanger 32 desuperheats the refrigerant passing therethrough. The liquid circulated through heat exchanger 32 is heated while the refrigerant is cooled. As in the fourth mode of operation, the superheated refrigerant supplied by the compressor may or may not be partially condensed in the third heat exchange means. Preferably, the gas will only be desuperheated so as to allow it to retain most of its heat content for space heating, which is likely the more important to the two heating functions of this mode. The refrigerant passes out of third heat exchange means 30, through valve 42 and and passes into first heat exchange means 18. As the refrigerant passes through heat exchanger 20 in a heat exchange relationship with indoor air being blown therethrough by blower 22 the refrigerant condenses, giving up heat to the indoor air. The now-condensed refrigerant passes through the check valve portion of expansion valve combination 48, through valve 46 and into the expansion valve portion of expansion valve combination 50. The refrigerant is next metered into second heat exchange means 24 where it is vaporized in a heat exchange relationship with outdoor air being drawn through heat exchanger 26 under the impetus of of fan 28. The vaporized refrigerant exits heat exchange means 24, passes through valve 40 and is returned to compressor suction port 16.

Figure 6:
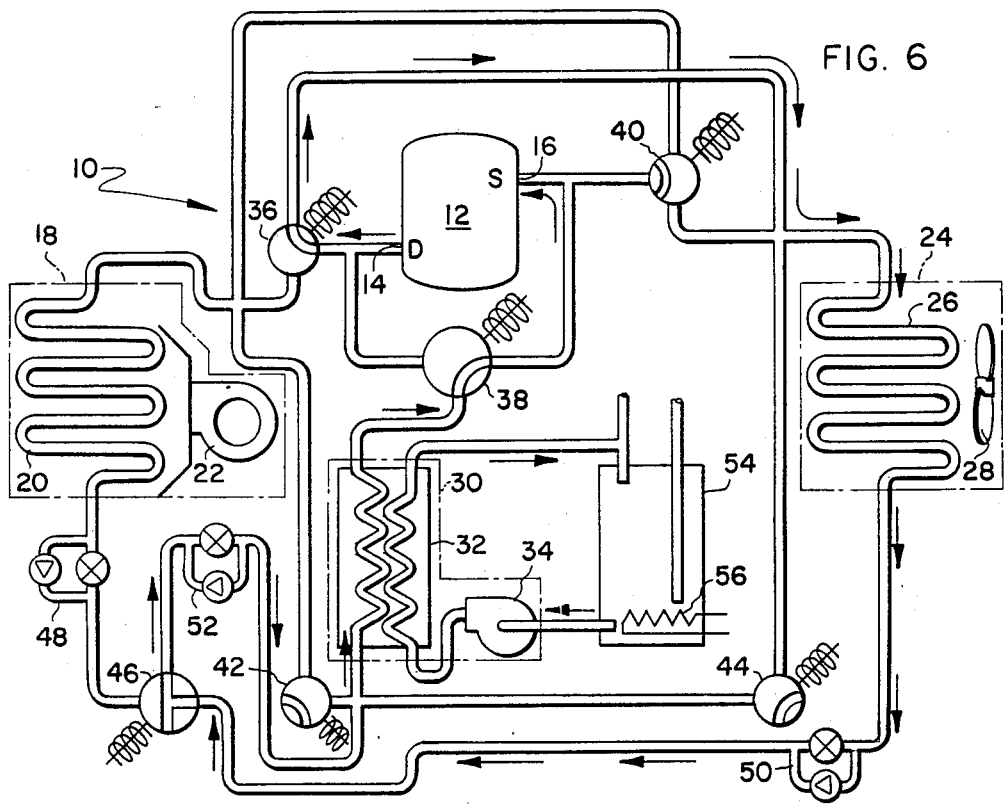
FIG. 6 is a schematic diagram of the present invention in the preferred defrost mode of operation in which only stored previously-heated liquid is employed to achieve defrost of the outdoor coil.

In a sixth mode of operation the present invention achieves the defrosting of heat exchanger 26 in second heat exchange means 24 utilizing only stored previously-heated liquid as a heat source. Referring to FIG. 6, compressor 12 discharges hot refrigerant gas through discharge port 14 and valve 36 directly into heat exchanger 26 of second heat exchange means 24. Fan 28 of second heat exchange means 24 is not energized in this mode with the result that superheated refrigerant gas passes through heat exchanger 26 unaffected by other than the heat exchange relationship it undergoes with the frost formed on the exterior of heat exchanger 26. The energizing of fan 28 and drawing of outdoor air through heat exchanger 26 in a defrost mode is to be avoided as it would serve only to dissipate heat in and inhibit the defrosting of heat exchanger 26. The refrigerant, after exiting heat exchanger 26, passes through the check valve portion of expansion valve combination 50 and through valve 46 prior to passing through the expansion valve portion of expansion valve combination 52. Refrigerant passing through expansion valve combination 52 is directed into heat exchanger 32 of third heat exchange means 30. Pump 34, and therefore third heat exchange means 30, is activated with the result that the liquid circulated through heat exchanger 32 vaporizes the refrigerant likewise passing therethrough. The use of a reversible pump to cause a counterflow of liquid with respect to refrigerant in heat exchange means 30 is to be considered as it would enhance heat exchange therein and therefore the efficiency of the system in this mode of operation. The vaporized refrigerant passes out of third heat exchange means 30 and through valve 38 prior to being delivered back to compressor suction port 16. In this defrost mode, which is the preferred and primary defrost mode of operation, refrigerant is not directed through first heat exchange means 18 which is inactive. The temperature of the indoor space is therefore unaffected by the defrost of heat exchanger 26 in second heat exchange means 24. It will be apparent that an alternate or secondary mode of defrost is available, that mode being the previously-known mode in which the heat pump system is shifted to the space cooling mode to accomplish defrost. This secondary mode will be avoided and the primary defrost mode described above employed at least whenever outdoor ambient conditions and the condition of the liquid stored in storage tank 54 permit the efficient use of the primary mode.

The control of circuit 10 will be apparent to those skilled in the art and is not of particular concern with regard to this invention. It is most likely that electronic controls will be employed which are responsive to system operating parameters such as, but not limited to, outdoor ambient temperature, stored liquid temperature, and heat exchanger coil temperatures. Control of valve actuators, the blower, the fan, and pump would most efficiently be accomplished utilizing a microprocessor. It is recognized that the more the valving is implemented in individual open/closed valves, the greater the flexibility will be in the circuit. This greater flexibility is obtained at a cost of mechanical complexity, additional conduit and system power efficiency. It is noted that expansion valve combination 52 might be eliminated under certain circumstances at no loss of system flexibility if, during the defrost mode in which stored previously-heated liquid is employed as a sole heat source, refrigerant were directed from valve 46 to first expansion valve combination 48 rather than to third expansion valve combination 52. The refrigerant directed to expansion valve combination 48 would be metered through the expansion valve portion thereof through inactive first heat exchange means 18, through valve 42 and into third heat exchange means 30 negating the necessity of third expansion valve combination 52. In most installations the employment of third expansion valve combination 52 will be preferred. The use or non-use of expansion valve combination 52 is predicted on the specific physical placement of individual valves in circuit 10 with regard to the indoor and outdoor heat exchange sections and the refrigerant conduit therebetween. It is also noted that if third heat exchange means 30 is employed as the only evaporator in a mode of system operation, as in the primary defrost mode, or as the only condenser in the system, as in the water heating mode described above, caution must be exercised with regard to the control of the refrigerant charge and possible refrigerant charge imbalances within the circuit. However, refrigerant charge imbalance can be offset by active or passive refrigerant charge control techniques well known to those skilled in the refrigeration arts.

What is claimed is:

1. A refrigeration circuit operable in a plurality of modes and including a plurality of heat exchange means, one of the heat exchange means operating as an evaporator in each mode of circuit operation, comprising:
    a refrigerant compressor having a suction port and a discharge port;
    means for storing liquid;
    first heat exchange means for transferring heat between refrigerant and an indoor space;
    second heat exchange means for transferring heat between refrigerant and an outdoor space;
    third heat exchange means for transferring heat between refrigerant and a liquid stored in said storage means;
    conduit means for providing a plurality of refrigerant flow paths among said first heat exchange means, said second heat exchange means, and said third heat exchange means within said refrigeration circuit;
    means disposed in said conduit means for selectively metering refrigerant to said one of said first, said second and said third heat exchange means operating as an evaporator in accordance with the mode in which said circuit is operating; and
    means for establishing direct refrigerant flow from said compressor discharge port to a selected one of said first, said second and said third heat exchange means whereby said circuit is operable at least in
    (i) a simultaneous indoor space heating and liquid heating mode in which refrigerant passes, in order, from said compressor to said third then said first then said second heat exchange means, said second heat exchange means operating as an evaporator;
    (ii) a simultaneous indoor space cooling and liquid heating mode in which refrigerant passes, in order, from said compressor to said third then said second then said first heat exchange means, said first heat exchange means operating as an evaporator; and,
    (iii) a primary defrost mode in which refrigerant bypasses said first heat exchange means and flows in order, from said compressor to said second heat exchange means and then to said third heat exchange means which operates as an evaporator so that defrost of said second heat exchange means is accomplished using heat extracted from a previously heated liquid stored in said storage means and without affecting the temperature of the indoor space.

2. The refrigeration circuit according to claim 1 wherein said second heat exchange means comprises a heat exchanger and a fan for causing air to flow through said heat exchanger, said fan being off when said circuit is operating in said primary defrost mode.

3. The refrigeration circuit according to claim 2 wherein said third heat exchange means comprises a desuperheater and a selectively activated pump, said pump, when activated, circulating a liquid through said desuperheater in a heat exchange relationship with refrigerant passing therethrough.

4. The refrigeration circuit according to claim 3 further comprising means for storing a liquid and means interconnecting said pump, said desuperheater and said means for storing a liquid so that liquid circulated through said desuperheater is supplied by and returned to said liquid storage means.

5. An air-to-air water heating heat pump circuit in which (1) both water and an indoor space are capable of simultaneously being heated using outdoor air as a source of heat, (2) in which an indoor space is capable of being cooled while water is simultaneously being heated and (3) in which defrost of the outdoor heat exchanger is capable of being accomplished using heat extracted only from stored, previously-heated water to vaporize refrigerant so as not to affect the temperature of an indoor space, comprising:
    a refrigerant compressor having a suction and a discharge port;
    a hot water tank;
    first selectively activated heat exchange means for transferring heat between refrigerant and indoor air;
    second selectively activated heat exchange means for transferring heat between refrigerant and outdoor air;
    third selectively activated heat exchange means for transferring heat between refrigerant and water stored in said hot water tank;
    means for selectively metering refrigerant to a selected one of said first, said second and said third heat exchange means;
    means for directing the delivery of refrigerant from said compressor discharge port directly to a selected one of said first, said second and said third heat exchange means; and
    means for selectively connecting said first, said second and said third heat exchange means for refrigerant flow so that
    (i) refrigerant flows from said compressor directly to said third heat exchange means, then to said first heat exchange means and then to said second heat exchange means in a simultaneous water heating and space heating mode of operation; or so that (ii) refrigerant flows from said compressor directly to said third heat exchange means then to said second heat exchange means and then to said first heat exchange means in a simultaneous space cooling and water heating mode of operation; or so that (iii) refrigerant flows from said compressor directly to said second heat exchange means, bypassing said first heat exchange means, and then flows to said third heat exchange means, whereby said second heat exchange means is defrosted in an accelerated defrost mode wherein the sole source of heat for vaporizing refrigerant returning to said compressor is water stored in said hot water tank at a temperature higher than the temperature of said indoor air.

6. The heat pump circuit according to claim 5 wherein said second heat exchange means comprises a heat exchanger and a fan for causing air to flow through said heat exchanger, said fan being off when said circuit is operating in said primary defrost mode.

7. The heat pump circuit according to claim 6 wherein said third heat exchange means comprises a desuperheater and a selectively activated pump, said pump, when activated, circulating water from said water tank through said desuperheater in a heat exchange relationship with refrigerant passing therethrough.

8. The heat pump circuit according to claim 5 wherein said water stored in said hot water tank is heated and/or capable of being reheated at a coefficient of circuit performance of greater than 1.0.

9. The heat pump circuit according to claim 8 wherein said means for connecting is further capable of directing flow among said heat exchange means so that (iv) refrigerant flows from said compressor directly to said first heat exchange means, bypasses said third heat exchange means, and then flows to said second heat exchange means in a space heating mode of operation;

(v) refrigerant flows from said compressor directly to said second heat exchange means, bypasses said third heat exchange means, and then flows to said first heat exchange means in a space cooling mode of operation; and (vi) refrigerant flows from said compressor directly to said third heat exchange means, bypasses said first heat exchange means, and then flows to said second heat exchange means in a water heating mode of operation.

10. The refrigeration circuit according to claim 1 wherein in said primary defrost mode defrost of said second heat exchange means is accomplished using heat produced and/or capable of being replaced at a coefficient of performance of greater than 1.0 and wherein said circuit is operable in a mode in which liquid is heated to and stored at a temperature higher than the temperature of said indoor space, whereby defrost of said second heat exchange means is accomplished in said primary defrost mode faster than it would be accomplished if said indoor space were employed as a heat source due to the elevated temperature of the stored liquid as compared to the temperature of the indoor space.

11. A method in a heat pump circuit having an indoor heat exchanger, an outdoor heat exchanger and a refrigerant-water heat exchanger comprising the steps of:

heating and compressing refrigerant gas in a compressor;

directing compressed refrigerant gas from said compressor directly and exclusively to a selected one of said indoor, said outdoor and said refrigerant-liquid heat exchangers;

heating water at a coefficient of performance greater than 1.0 in said refrigerant-liquid heat exchanger;

storing said water heated at a coefficient of performance of greater than 1.0;

selecting to direct refrigerant from said compressor directly to said refrigerant-liquid heat exchanger, then to said indoor heat exchanger and then to said outdoor heat exchanger when water heating and space heating are simultaneously called for;

selecting to direct refrigerant from said compressor directly to said refrigerant-liquid heat exchanger, then to said outdoor heat exchanger and then to said indoor heat exchanger when water heating and space cooling are simultaneously called for;

selecting to direct refrigerant from said compressor directly to said outdoor heat exchanger, then to said refrigerant-liquid heat exchanger when defrost of the outdoor heat exchanger coil is called for, whereby defrost of the outdoor coil is accomplished without affecting the temperature of the indoor space, is accelerated by use of a defrost heat source which is at a temperature higher than the indoor space and is accomplished employing heat stored and/or capable of being replaced at a coefficient of performance greater than 1.0.

12. The method according to claim 11 wherein said water heating step includes the step of discharging refrigerant gas directly from said compressor to said refrigerant-liquid heat exchanger and the step of circulating stored water through said refrigerant-liquid heat exchanger.

* * * * *